A. J. KELLY.
CONVERTIBLE VEHICLE.
APPLICATION FILED APR. 30, 1921.
1,435,609.
Patented Nov. 14, 1922.
3 SHEETS—SHEET 1.
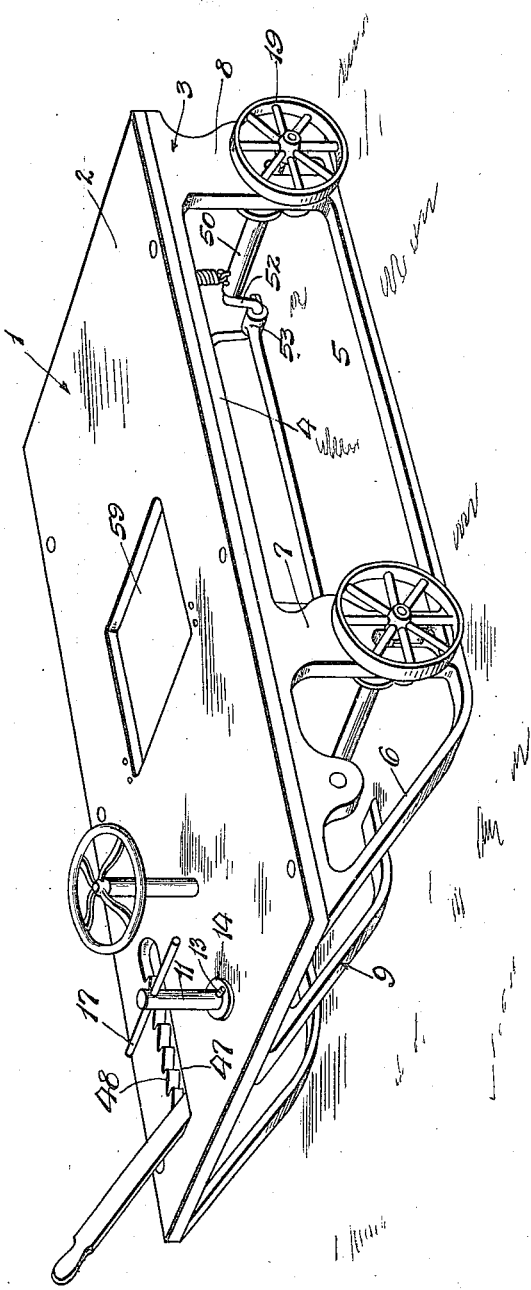
Inventor
A. J. Kelly.
By Lacey & Lacey, Attorneys

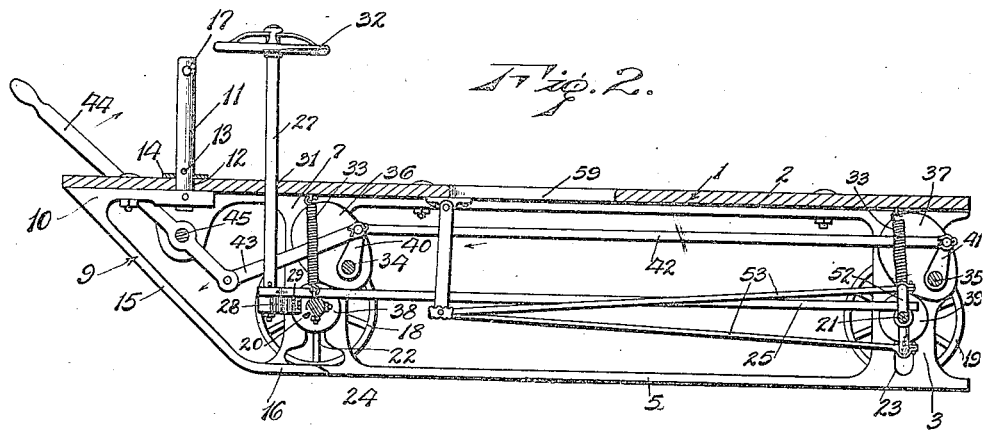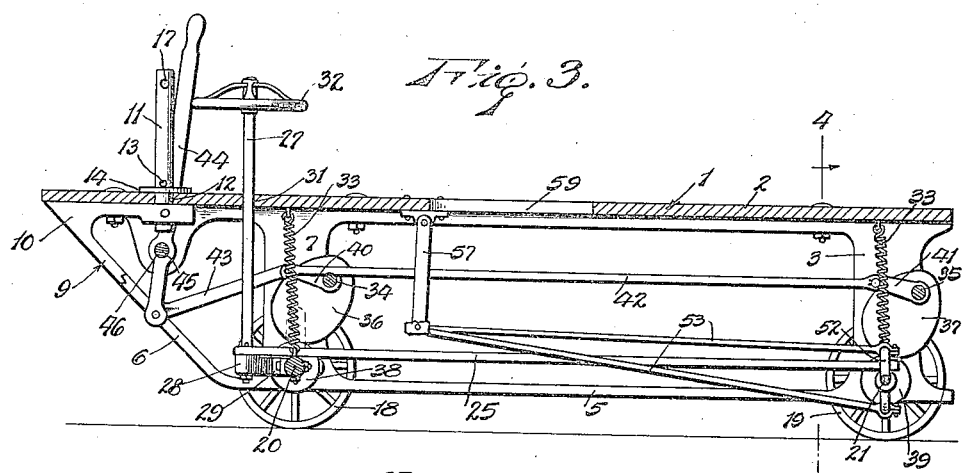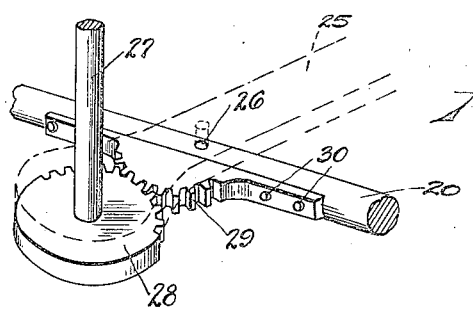

A. J. KELLY.
CONVERTIBLE VEHICLE.
APPLICATION FILED APR. 30, 1921.

1,435,609.

Patented Nov. 14, 1922.
3 SHEETS—SHEET 3.

Inventor
A. J. Kelly.
By Lacey & Lacey, Attorneys

Patented Nov. 14, 1922.

1,435,609

UNITED STATES PATENT OFFICE.

ANDREW J. KELLY, OF BALTIMORE, MARYLAND, ASSIGNOR OF ONE-HALF TO JOHN IRA KELLY, OF BALTIMORE, MARYLAND.

CONVERTIBLE VEHICLE.

Application filed April 30, 1921. Serial No. 465,882.

*To all whom it may concern:*

Be it known that I, ANDREW J. KELLY, a citizen of the United States, residing at Baltimore, in the county of Baltimore City and State of Maryland, have invented certain new and useful Improvements in Convertible Vehicles, of which the following is a specification.

This invention relates to improvements in children's vehicles and more particularly to that type which are adapted to be supported for travel selectively upon runners or wheels so that the vehicle will be useful under all weather conditions and may be appropriately adjusted in accordance therewith, and one of the primary objects of the present invention is to provide a novel means adapted to be readily and conveniently operated for the purpose of bringing the runners or wheels of the vehicle selectively into use.

Another object of the invention is to so construct a vehicle of the type above referred to that the presence of the means provided for converting the vehicle will not in any way interfere with the steering of the vehicle when supported upon its wheels.

Another object of the invention is to provide an improved means for steering the front wheels of the vehicle.

A further object of the invention is to provide novel means whereby the vehicle may be steered when employed as a sled and supported upon its runners.

A further object of the invention is to provide means whereby, when the vehicle is supported upon its runners, its wheels will be supported clear of the ground, and on the other hand when it is supported by its wheels, its runners will be supported clear of the ground so that when either is in use there will be no interference on the part of the other.

A further object of the invention is to provide in connection with the structure generally described above, pedal operated means whereby the rear axle of the vehicle may be driven.

In the accompanying drawings:

Figure 1 is a perspective view of the vehicle embodying the present invention;

Figure 2 is a vertical longitudinal sectional view therethrough, the vehicle being supported upon its runners;

Figure 3 is a similar view illustrating the vehicle converted to be supported upon its wheels;

Figure 4 is a vertical transverse sectional view on the line 4—4 of Figure 3 looking in the direction indicated by the arrows;

Figure 5 is a front elevation of the vehicle;

Figure 6 is a perspective view of a portion of the steering gear which is usable when the vehicle is supported upon its wheels.

The vehicle embodying the invention comprises a body which is indicated in general by the numeral 1 and is preferably in the nature of a platform 2 supported upon side frames indicated in general by the numeral 3. The side frames 3 include upper longitudinal members 4 to which the sides of the platform 2 are secured in any suitable manner, and lower portions 5 which constitute runners and which are curved or inclined upwardly at their forward end portions as indicated by the numeral 6. The portions 4 and 5 are connected and relatively braced by front and rear bolster members indicated respectively by the numerals 7 and 8. The runners 5 of course constitute means for supporting the body of the vehicle for travel over snow covered or icy surfaces, and in order that the vehicle may, when so employed, be steered, there is provided at the front of the body a steering runner which is indicated in general by the numeral 9 and which comprises a head 10 secured in any suitable manner to the lower end of an upright steering post 11 mounted for turning movement in an opening 12 formed in the front end portion of the platform 2. The post is supported within the opening 12 against downward displacement by means of a pin 13 passing diametrically therethrough and engaging at its ends against the upper surface of a wear plate 14 which is disposed to surround the post and in turn rests upon the upper side of the said platform 2. The steering runner 9 comprises a bar 15 which is integral with or secured to the forward end of the head 10 and which is inclined downwardly and rearwardly from the said head and terminates in a rearwardly extending ground-engaging shoe 16 occupying substantially the same plane as the side runners 5 of the vehicle. A handle bar 17 is mounted at the upper end of the steering post 11 and by means of the same the said post may be turned so as to swing the steering runner 9 and thereby change the course of travel of the vehicle.

In order that the vehicle body may be supported for travel otherwise than upon the runners 5, front and rear wheels are provided and are indicated respectively by the numerals 18 and 19. The wheels 18 and 19 are mounted upon front and rear axles respectively designated by the numerals 20 and 21 and these axles are movably mounted in slots 22 and 23 formed respectively in the front and rear of both members 7 and 8. The slots 22 and 23 extend vertically of the front and rear bolster members 7 and 8 so that the movement of the axles 20 and 21 is in a like direction and when the axles are moved downwardly to the lower ends of the slots, the wheels 18 and 19 will project at their lower portions below the runners 5 for the purpose of supporting the vehicle in the manner stated. On the other hand when the axles 20 and 21 are moved upwardly to the upper ends of the slots 22 and 23, the wheels will be spaced at their lower portions above the planes of the runners 5 and the vehicle body will at such time be supported upon the said runners. The slots 23 are of uniform width from their upper to their lower ends so that there can be no turning movement of the axle 21, but the slots 22 at their lower ends are broadened in a front to rear direction as indicated by the numeral 24 so that the front axle 20, when lowered to the lower ends of the slots 22, may have rocking movement in a horizontal plane and when so moved the vehicle may be steered. The axles 20 and 21 are connected and relatively braced for movement in unison by means of a reach bar which is indicated by the numeral 25 and which extends longitudinally medially between the body of the vehicle and is bolted or otherwise secured to the upper side of the said axles, projecting at its forward end a short distance beyond the forward axle as clearly shown in Figures 2 and 3 of the drawings. The means provided for connecting the reach bar 25 with the front axle 20 is preferably in the nature of a king bolt 26 so that the axle may have turning movement with relation to the said bar, and rotatably supported by the forward end of the bar 25 is an upright steering post 27 having fixed to its lower end beneath the said forward end of the bar 25 a segmental steering gear 28 which meshes with a segmental rack 29 bolted or otherwise secured, as at 30, to the forward side of the front axle 20. The steering post 27 extends upwardly through an opening 31 in the platform 2 preferably immediately in rear of the steering post 11 and is provided at its upper end with a steering wheel 32 which may be grasped and manipulated for the purpose of turning the said post 27 and, through the medium of the gear 28 and rack 29, imparting oscillatory movement to the front axle 20 so as to steer the vehicle in one direction or the other when the ground wheels are in use. When the ground wheels are not in use and the runners are active, the axle 20 will engage at its ends in the upper end portions of the slots 22 and as these portions of the said slots are relatively narrow, the said axle will under these conditions be held against turning movement about its king bolt 26.

Normally or at least when the runners are in action, the axles 20 and 21 are supported in an elevated position by means of springs 33 secured to the upper sides of the axles and to the under side of the platform 2, the springs being preferably arranged in pairs so as to equally elevate the ends of the respective axles. These springs therefore constitute the means heretofore referred to as being provided for the purpose of supporting or holding the ground wheels elevated above the plane of the runners when the wheels are not in use for the purpose of supporting the vehicle for travel. Means however is provided for the purpose of lowering the axles 20 and 21 so as to correspondingly move the wheels and thus bring them into play and this means will now be described.

Shafts 34 and 35 are rotatably mounted in the bolster members 7 and 8 respectively of the side frames 3 and are located respectively above and rearwardly of the front and rear axles 20 and 21 and fixed upon the end portions of the shaft are cams 36 and 37 the peripheries of which ride in engagement with the peripheries of anti-friction wheels 38 and 39 which are rotatably mounted upon the end portions of the axles 20 and 21 respectively, the cams and the respective anti-friction wheels being located in common vertical planes immediately inwardly of the side frames 3. It will now be evident that when the cams are in the position shown in Figure 2 of the drawings, the springs 33 will hold the front and rear axles in an elevated position so that the runners will be active but if the shafts 34 and 35 are rotated in a forward direction, the cams 36 and 37, in rotating in a like direction, will depress the anti-friction wheels 38 and 39 and move the front and rear axles downwardly in the slots 22 and 23 as illustrated in Figure 3 of the drawings. In order that the shafts 34 and 35 may be so rotated and simultaneously, crank arms 40 and 41 may be fixed upon the shafts 34 and 35 respectively and are connected by a rod 42 extending between and pivotally joined with their upper ends. A rod 43 is pivotally connected with the forward ends of the rod 42 and also to the lower end of an operating lever which is indicated by the numeral 44 and which is pivotally mounted, as at 45, upon a shaft 46 extending transversely between the forward portions of the side frames 3 of the vehicle. The lever 44 works in a slot 47 formed in the platform 2 of the vehicle, and one wall of this slot 47 is formed to provide a rack 48 with which the lever may be engaged at selected points in its swinging movement and thus be held in its positions of adjustment. When the lever is at the forward limit of its movement and is resting in engagement with the forward end wall of the slot 47, the vehicle is supported for travel upon the runners 5 and the axles 20 and 21 are in elevated position, this position of the parts being clearly shown in Figure 2. On the other hand when the lever is swung rearwardly, the cams 36 and 37 will be rotated to depress the axles 20 and 21 and thus bring the ground wheels 18 and 19 into play.

From the foregoing description of the invention it will be evident that the vehicle embodying the same may be readily converted to adapt it for travel over ordinary road or pavement surfaces or for travel over snow covered or icy surfaces, in accordance with weather conditions and the desires of the user. It will furthermore be evident that the converting of the vehicle is accomplished by the mere adjustment of the lever 44 and that whether the vehicle be supported by the runners 5 or by the ground wheels 18 and 19, it may be steered in its course of travel.

The wheels 18 are freely rotatably mounted upon the ends of the axle 20, and the springs 33 and reach bar 25 are connected directly with this axle as are also the wheels 38 but as it is desired that the rear axle be driven by a pedal operated means, the wheels 19 are fixed upon the ends thereof, and the end portions of the axle are journaled in sleeves 50 upon which are fixed the anti-friction wheels 39 and to which are connected the lower ends of the respective supporting springs 33 as best shown in Figures 4 and 5 of the drawings. A sleeve 51 is loosely fitted onto the intermediate portion of the axle, and the said reach bar 25 is secured to this sleeve in the manner shown in Figure 4. Between the adjacent ends of the sleeves 50 and 51, the axle is provided with oppositely extending cranks 52 to which are connected the rear ends of pitman rods 53, the forward ends of these rods being pivotally connected, as at 54, with pins 55 which support the pedals 56, the pins being mounted at the lower ends of pedal hangers 57 pivotally supported for backward and forward oscillation, as at 58, beneath the platform 2 of the vehicle and at the opposite sides and front of an opening 59 formed in the said platform to accommodate the limbs of the child using the vehicle.

Having thus described the invention, what is claimed as new is:

1. In a vehicle of the class described, a body, side frames supporting the body and having runners, axles mounted for up and down adjustment in the frames, wheels carried by the axles, shafts located above the axles, cams carried by the shafts and coacting directly with the axles, and manually operable means for rotating the shafts to swing the cams downwardly and depress the axles.

2. In a vehicle of the class described, a body, side frames supporting the body and having runners, axles mounted for up and down adjustment in the frames, wheels carried by the axles, shafts mounted above and rearwardly of the axles, cams carried by the shafts and coacting with the axles, crank arms extending from the shafts, a rod connecting the crank arms, and means operatively connected with the crank arms for swinging the same to rock the shafts and cause the cams to coact with and depress the said axles.

3. In a vehicle of the class described, a body, side frames supporting the body and having runners, axles mounted for up and down adjustment in the frames, ground wheels carried by the axles, anti-friction wheels rotatably mounted upon the axles, shafts mounted adjacent the axles, cams carried by the shafts and coacting with the anti-friction wheels, and manually operable means for rotating the shafts.

4. In a vehicle of the class described, a body, side frames supporting the body and having runners, the side frames having substantially perpendicular slots therein, axles mounted for up and down adjustment in the slots, wheels carried by the axles, means for shifting the axles in the slots longitudinally thereof whereby to selectively bring the runners and wheels into supporting positions, the slots for the forward axle having branches at their lower ends to permit of lateral oscillation of the said axle when in lowered position, and manually operable means for oscillating the said axle to steer the vehicle.

5. In a vehicle of the class described, a body, side frames supporting the body and having runners, the side frames having substantially perpendicular slots therein, axles mounted for up and down adjustment in the slots, wheels carried by the axles, means for shifting the axles in the slots longitudinally thereof whereby to selectively bring the runners and wheels into supporting position, the slots for the forward axle having branches at their lower ends to permit of lateral oscillation of the said axle when in lowered position, and manually operable means for oscillating the said axle to steer the vehicle, the said means comprising a segmental rack upon the said forward axle, the steering post and a gear upon the steering post coacting with the said rack.

6. In a vehicle of the class described, a body, side frames supporting the body and having runners, the side frames having substantially perpendicular slots therein, axles mounted for up and down adjustment in the slots, wheels carried by the axles, means for shifting the axles in the slots longitudinally thereof whereby to selectively bring the runners and wheels into supporting position, the slots for the forward axle having branches at their lower ends to permit of lateral oscillation of the said axle when in lowered position, manually operable means for oscillating the said axle to steer the vehicle the said means comprising a segmental rack upon the forward axle, a steering post and a gear upon the steering post coacting with the said rack, and a reach bar extending between the axles and having pivotal connection with the said forward axle, the said reach bar supporting the said steering post.

In testimony whereof I affix my signature.

ANDREW J. KELLY. [L. S.]